Patented Oct. 25, 1949

2,485,696

UNITED STATES PATENT OFFICE 2,485,696

MOTOR FUEL

Joseph A. Chenicek, Chicago, Ill., assignor to Universal Oil Products Company, Chicago, Ill., a corporation of Delaware No Drawing. Application September 26, 1945, Serial No. 618,799

3 Claims. (Cl. 44—75)

This invention relates to a method of preventing the deleterious effect of iron and iron compounds on organic substances.

Numerous organic compounds as, for example, gasoline, medicinal oils, lubricating oils, rubber, alcohols, ethers, esters, acids, etc., tend to undergo undesired oxidation reactions in storage and during use, with the resultant formation of gums, discoloration of the organic compounds and other undesirable reactions.

To prevent these undesirable reactions, an oxidation inhibitor is utilized. Numerous inhibitors are known for this purpose, the most common ones being aminophenols, phenylene diamines, wood tar fractions, catechols, cresols, etc. These inhibitors are normally used in amounts of from about 0.001% to 0.1% by weight of the organic compound, although in some cases they may be used in slightly greater proportions.

However, it has been noted that organic compounds, either with or without an inhibitor, are deleteriously affected by iron and iron compounds. For example, the containers in which the organic compounds are stored, may become rusted. Similarly, the pipe lines, oil cars, pumps, or other equipment utilized for the transportation of organic compounds may be rusted and thereby deleteriously affect the organic compound.

I have now found that the deleterious effect of iron and iron compounds may be prevented by adding to the organic compound a small amount of a particular type of compound which prevents such deleterious effect and in most cases actually improves the stability of the organic compound beyond its original value. The organic compound may also contain an oxidation inhibitor if desired.

In a broad aspect, the present invention relates to the method of preventing the deleterious effect of iron and iron compounds on an organic compound, which may or may not contain an oxidation inhibitor which comprises adding thereto an ortho-nitroso-phenol in a small but sufficient amount to prevent said deleterious effect.

Nitrosophenol as used in the present specification and claims is intended to include mono and poly-cyclic aromatic compounds containing one or more hydroxy groups attached to the ring, and thus the invention contemplates such compounds as ortho-nitroso-phenol, 1-nitroso-2-naphthol, 2-nitroso-1-naphthol, 1-nitroso-2-anthrol, 2-nitroso-1-anthrol, 2,4-di-nitroso-resorcinol, 3,5-dinitroso-2,4-dihydroxy-1-methylbenzene, etc. In addition, the broad term ortho-nitroso-phenol as used herein is intended to include the compounds hereinbefore set forth which also contain various substituent groups, such as alkyl, naphthenyl, halogen, amino, etc., or mixtures thereof, and particularly a substituent group comprising an additional nitroso-group and still more particularly when the additional nitroso group is positioned ortho to another hydroxy group. Thus a particularly suitable compound for use in the present invention comprises di-nitroso-resorcinol, (1,3-dihydroxy-2,4-dinitroso-benzene.)

The ortho-nitroso-phenol of the present invention will generally be used in substantially the same amount as the oxidation inhibitor and thus will be within the range of about 0.001% to about 0.1% by weight, although it is understood that a greater amount may be employed, which generally will not be in excess of about 1% of the organic compound.

When used in the presence of an oxidation inhibitor, the nitroso-phenol may be added to the organic compound either before or after the inhibitor is introduced thereto or it may be introduced simultaneously therewith, in which case it may be preferred to admix the inhibitor with the nitroso-phenol and then add the mixture to the organic compound.

The following examples are introduced further to illustrate the novelty and utility of the present invention but not with the intention of unduly limiting the same.

A Pennsylvania cracked gasoline was inhibited with 0.1% by weight of an aminophenol inhibitor and the induction period was found to be 630 minutes. Iron rust, obtained from old equipment exposed to the atmosphere, was added to the gasoline containing inhibitor in the various proportions with the following results:

Table I

| Iron Rust, Grams per Liter | Induction Period, Minutes |
|---|---|
| 0 | 630 |
| 2.5 | 490 |
| 5.0 | 455 |
| 10.0 | 450 |
| 25.0 | 420 |

It will be noted that the induction period fell from 630 minutes to 420 minutes by the addition of the iron rust. It is, of course, difficult to determine the exact quantity of rust which will be in contact with the gasoline in actual use but it is apparent that a definite deleterious effect occurs upon such contact.

In order to further test the effect of iron compounds in gasoline containing inhibitor, pure iron oxide ($Fe_2O_3$) was added to another sample of the same gasoline containing the inhibitor in various proportions as follows:

*Table II*

| Fe₂O₃, Grams per Liter | Induction Period, Minutes |
|---|---|
| 0 | 630 |
| 1.25 | 555 |
| 2.50 | 490 |
| 3.75 | 485 |
| 5.0 | 450 |
| 10.0 | 410 |
| 25.0 | 380 |

It will be noted that the effect of pure Fe₂O₃ is somewhat similar to that of iron rust.

In order to still further test other forms of iron, the following additional experiments were conducted. Table III shows results obtained when adding iron powder and Table IV shows the effect when adding a soluble iron compound, namely ferric oleate.

*Table III*

| Iron Powder, Grams per Liter | Induction Period, Minutes |
|---|---|
| 0 | 630 |
| 1.25 | 610 |
| 2.50 | 610 |
| 3.75 | 610 |
| 5.0 | 595 |
| 25.0 | 525 |

It will be noted that the effect of iron powder is not as great as the effect of iron rust or pure Fe₂O₃. Nevertheless, there is a definite deleterious effect, particularly when such large quantities as 25 grams per liter are contacted with the gasoline.

*Table IV*

| Ferric Oleate, Milligrams per Liter | Induction Period, Minutes |
|---|---|
| 0 | 630 |
| 1.0 | 585 |
| 2.0 | 555 |
| 5.0 | 520 |

It will be noted that the deleterious effect of soluble iron is more pronounced and therefore more objectionable.

In order to show that this deleterious effect is encountered with inhibitors other than the aminophenol inhibitor utilized in the previous experiments, two other inhibitors—(1) a phenylenediamine-type inhibitor, and (2) dibutylated cresol were tested.

Table V shows the results obtained with these inhibitors;

*Table V*

| Fe₂O₃, Grams per Liter | Induction Period of Gasoline Inhibited with Phenylene Diamine | Induction Period of Gasoline Inhibited with Dibutylated Cresol |
|---|---|---|
| 0 | 910 | 915 |
| 5 | 770 | 800 |
| 25 | 690 | 725 |

It will be noted that a similar deleterious effect of iron obtains with these other inhibitors.

*Example I*

As noted in Table I the induction period of the Pennsylvania cracked gasoline containing 0.01% of an aminophenol inhibitor was 630 minutes. Upon the addition of 1 mg. of iron oleate per liter, the induction period fell to 585 minutes. When 0.01% by weight of 1-nitroso-2-naphthol was added, the induction period increased to 655 minutes. It will be noted that, not only was the deleterious effect of iron prevented, but actually the stability of the gasoline was improved from an induction period of 630 minutes to 655 minutes. 1-nitroso-2-naphthol, when added to the same gasoline containing the same inhibitor but in the absence of iron, did not increase the induction period but in fact lowered it from 630 to 605 minutes. However, in the presence of the iron compound, an unexpected increase in induction period to 655 minutes was obtained.

*Example II*

0.01% of di-nitroso-resorcinol, (1,3-dihydroxy-2,4-di-nitrosobenzene) was added to another sample of the same cracked gasoline containing the same inhibitor and 1 mg. of iron oleate (induction period 585 minutes) and increased the induction period to 730 minutes. It will be noted that the di-nitroso-resorcinol not only offset the deleterious effect of the iron compound, but actually considerably improved the stability of the gasoline.

*Example III*

An interesting observation is the fact that various metal deactivators which have been used in gasoline to offset the deleterious effect of copper and other metals are not effective for preventing the deleterious effect of iron compounds. For example, 1,2-di-(salicylalamino)-propane, which is very effective in preventing deactivation by copper, when added to another sample of the same gasoline containing the same inhibitor and 1 mg. of iron oleate per liter (induction period 585 minutes) actually caused a large drop in induction period to 270 minutes.

It is apparent from the above results that one can not predict in advance just which compounds will function satisfactorily to prevent the deleterious effect of iron.

I claim as my invention:

1. Gasoline contaminated with an iron impurity and containing from about 0.001% to about 0.1% by weight of an aminophenol oxidation inhibitor and from about 0.001% to about 1% by weight of an ortho-nitroso-phenol.

2. Gasoline contaminated with an iron impurity and containing from about 0.001% to about 0.1% by weight of an aminophenol oxidation inhibitor and from about 0.001% to about 1% by weight of 1-nitroso-2-naphthol.

3. Gasoline contaminated with an iron impurity and containing from about 0.001% to about 0.1% by weight of an aminophenol oxidation inhibitor and from about 0.001% to about 1% by weight of di-nitroso-resorcinol.

JOSEPH A. CHENICEK.

REFERENCES CITED

The following references are of record in the file of this patent:

UNITED STATES PATENTS

| Number | Name | Date |
|---|---|---|
| 1,982,277 | Winning | Nov. 27, 1934 |